US012798210B2

(12) United States Patent
Lin et al.

(10) Patent No.: US 12,798,210 B2
(45) Date of Patent: Nov. 17, 2026

(54) MIXED COLLECTION AND COMPRESSION DEVICE FOR DUST AND THIN METAL

(71) Applicant: Dongguan Villo Technology Inc., Dongguan (CN)

(72) Inventors: Weibo Lin, Dongguan (CN); Kaimin Cai, Dongguan (CN); Nan Miao, Dongguan (CN); Weihao Wang, Dongguan (CN); Shiyun Chu, Dongguan (CN)

(73) Assignee: DONGGUAN VILLO TECHNOLOGY INC., Dongguan (CN)

( * ) Notice: Subject to any disclaimer, the term of this patent is extended or adjusted under 35 U.S.C. 154(b) by 302 days.

(21) Appl. No.: 18/820,272

(22) Filed: Aug. 30, 2024

(65) Prior Publication Data

US 2025/0360683 A1 Nov. 27, 2025

(30) Foreign Application Priority Data

May 22, 2024 (CN) ........................ 202421132056.8

(51) Int. Cl.
*B30B 15/30* (2006.01)
*B01D 46/00* (2022.01)
(Continued)

(52) U.S. Cl.
CPC .......... *B30B 15/30* (2013.01); *B01D 46/0005* (2013.01); *B01D 46/0093* (2013.01);
(Continued)

(58) Field of Classification Search
CPC ... B30B 15/30; B30B 15/0082; B30B 9/3096; B30B 9/327; B01D 46/58; B01D 46/62;
(Continued)

(56) References Cited

U.S. PATENT DOCUMENTS

2024/0399272 A1* 12/2024 Koblenzer ......... B01D 19/0036

FOREIGN PATENT DOCUMENTS

CN 110126336 A * 8/2019 ......... B30B 15/0082
CN 115445349 A * 12/2022 ........... B01D 46/446
(Continued)

OTHER PUBLICATIONS

Machine translation of CN-119502441-A (Year: 2025).*
(Continued)

*Primary Examiner* — Robert Clemente

(57) ABSTRACT

A mixed collection and compression device for dust and thin metal includes a separation mechanism used to sieve a flowing gas therein into a dust-containing gas and a metal material; a filtering mechanism connected to the separation mechanism and used to filter dust in the dust-containing gas; an inert powder adding mechanism connected between the separation mechanism and the filtering mechanism and used to add inert powder into the dust-containing gas during transportation; a compression mechanism connected to the separation mechanism and used to collect and compress the metal material; and a power gas source used to provide a negative pressure environment for a gas inside the separation mechanism to make the gas sequentially pass through the separation mechanism, the inert powder adding mechanism, and the filtering mechanism. It has the effects of reducing the explosion risk and improving the safety of field work.

9 Claims, 7 Drawing Sheets

(51) Int. Cl.

| | |
|---|---|
| ***B01D 46/24*** | (2006.01) |
| ***B01D 46/58*** | (2022.01) |
| ***B01D 46/62*** | (2022.01) |
| ***B01D 46/71*** | (2022.01) |
| ***B30B 9/30*** | (2006.01) |
| ***B30B 15/00*** | (2006.01) |

(52) U.S. Cl.
CPC .......... *B01D 46/2411* (2013.01); *B01D 46/58* (2022.01); *B01D 46/62* (2022.01); *B01D 46/71* (2022.01); *B30B 9/3096* (2013.01); *B30B 15/0082* (2013.01); *B01D 2265/06* (2013.01); *B01D 2267/30* (2013.01); *B01D 2273/12* (2013.01)

(58) Field of Classification Search
CPC .......... B01D 46/70–72; B01D 46/0005; B01D 46/24–2414; B01D 46/0093; B01D 2265/06; B01D 2267/30; B01D 50/20; B07B 4/08; B07B 1/55
See application file for complete search history.

(56) References Cited

FOREIGN PATENT DOCUMENTS

| | | | | | |
|---|---|---|---|---|---|
| CN | 119502441 | A | * | 2/2025 | ......... B01D 46/0086 |
| EP | 1270060 | A1 | * | 1/2003 | ............. B01D 50/20 |
| KR | 101259749 | B1 | * | 4/2013 | ............... B30B 9/14 |

OTHER PUBLICATIONS

Machine translation of CN-110126336-A (Year: 2019).*
Machine translation of CN-115445349-A (Year: 2022).*
Machine translation of EP-1270060-A1 (Year: 2003).*
Machine translation of KR-101259749-B1 (Year: 2013).*

* cited by examiner

MIXED COLLECTION AND COMPRESSION DEVICE FOR DUST AND THIN METAL

CROSS-REFERENCE TO RELATED APPLICATION

This application claims priority to Chinese patent application No. 202421132056.8, filed to China National Intellectual Property Administration (CNIPA) on May 22, 2024. The entire contents of the above-mentioned application are incorporated herein by reference.

TECHNICAL FIELD

The disclosure relates to the field of metal material treatment technologies, and more particularly to a mixed collection and compression device for dust and thin metal.

BACKGROUND

In the process of processing metal foil in various industries, many continuous strip-shaped thin metal materials or segmented thin metal materials, that is, scraps, are often produced through rolling, die cutting, grinding and other processes, and these scraps can be collected or secondary recycling. There are the following problems in the process of collecting these scraps.

(1) Thin metal materials will occupy a large volume, and they are mainly collected by large-capacity metal boxes or long plastic bags, and the collected thin materials still occupy a large volume, so it is necessary to use a special trailer to transfer the collected thin materials, which will waste a lot of space for storage and is not convenient for site maintenance.

(2) Due to the high processing speed of the production line in general, it needs to be handled by specialized personnel, the interval between manual processing is short, the collection work intensity is high, and the human resource cost is high.

(3) Due to the processing process, these scraps are usually mixed with a lot of metal dust. Ordinary processing methods will cause the metal dust to float in the air when collecting and processing the scraps, which will contaminate the clean workshop. When the metal dust is concentrated and forms dust clouds, there will be a high explosion risk and a risk of jeopardizing the safety of the human body.

Therefore, there is an urgent need for a device to treat the thin metal materials and the dust separately, which can not only reduce the maintenance cost of thin metal materials, but also ensure that it will not affect the clean workshop and reduce the explosion risk caused by the metal dust.

SUMMARY

Aiming at the problems of inconvenient site maintenance, serious waste of human resources, pollution of clean workshop and explosion risk in the existing mixed treatment of dust and thin metal, the disclosure provides a mixed collection and compression device for dust and thin metal.

The above-mentioned inventive purpose of the disclosure is achieved through the following technical solutions. Specifically, the mixed collection and compression device includes a separation mechanism, a filtering mechanism, an inert powder adding mechanism, a compression mechanism, and a power gas source.

The separation mechanism is configured (i.e., structured and arranged) to sieve a flowing gas in the separation mechanism into a dust-containing gas and a thin metal material.

The filtering mechanism is connected to the separation mechanism and configured to filter dust in the dust-containing gas.

The inert powder adding mechanism is connected between the separation mechanism and the filtering mechanism, and is configured to add inert powder into the dust-containing gas during transportation.

The compression mechanism is connected to the separation mechanism and configured to collect and compress the thin metal material.

The power gas source is configured to provide a negative pressure environment for a gas inside the separation mechanism to make the gas sequentially pass through the separation mechanism, the inert powder adding mechanism, and the filtering mechanism.

By adopting the technical solution, under an action of the power gas source, the dust and the thin metal material can be guided to directionally flow in the separation mechanism along with a gas flow. The separation mechanism sieves the flowing gas into the dust-containing gas and the thin metal material, and then processes them separately, that is, the dust-containing gas is filtered by the filtering mechanism, and the thin metal material is compressed by the compression mechanism. In this situation, it can avoid the dust from being mixed with the thin metal material and reduce the possibility of contaminating the clean workshop. Under an action of the inert powder adding mechanism, inert dust is mixed in the dust-containing gas, which can increase the minimum ignition energy of mixed metal dust to reduce the explosion risk and improve the safety of field work, while the degree of automation is high, which can reduce the cost of human resources.

In an embodiment, the inert powder adding mechanism includes a connection pipe, an air pump, and an inert powder storage component. The connection pipe is connected to the separation mechanism and the filtering mechanism. The air pump is connected to the connection pipe and the inert powder storage component, and the inert powder storage component is equipped with the inert powder.

By adopting the technical solution, the connection pipe is arranged to provide a connecting passage for the separation mechanism and the filtering mechanism, so that the inert powder storage component can mix the inert dust with the dust-containing gas before the dust-containing gas enters the filtering mechanism under the action of the air pump, and the explosion risk is reduced.

In an embodiment, the separation mechanism includes a separation chamber. A first sieve plate is arranged in the separation chamber, and the first sieve plate is configured to filter the thin metal material. The separation chamber is divided into an upper ventilation area and a lower buffer area through the first sieve plate, the upper ventilation area is connected to the filtering mechanism, and the lower buffer area is connected to the compression mechanism. The separation chamber is defined with an air inlet, and the air inlet is located in the lower buffer area. The first sieve plate is provided with a first pulse blowback component, and the first pulse blowback component is configured to blow the thin metal material accumulated under the first sieve plate to the compression mechanism.

By adopting the technical solution, since the air inlet is arranged in the lower buffer area, when external dust and the thin metal material enter the separation chamber along with the airflow, the airflow upwards passes through the first sieve plate according to a guiding direction and enters the upper ventilation area, and then enters the filtering mechanism. At this time, the thin metal material is accumulated below the sieve plate under the interaction of the airflow and the first sieve plate. After the thin metal material is accumulated to a certain amount, the pulse blowback component is started, so that the accumulated thin metal materials are blown into the compression mechanism to carry out a compression process, thereby realizing the separation of the dust-containing gas and the thin metal materials.

In an embodiment, the lower buffer area is connected to the filtering mechanism, a connection position of the lower buffer area is provided with a second sieve plate, and the second sieve plate is configured to filter the thin metal material.

By adopting the above technical solution, the lower buffer area is provided with the connection position for connecting to the filtering mechanism, so that part of escaped dust affected by gravity can enter the filtering mechanism from the lower buffer area along with the airflow, thereby improving the filtering efficiency. By arranging the second sieve plate, the thin metal material can be effectively resisted from passing through, and at the same time, the high-pressure pulse airflow enters the compression mechanism under the action of the pulse blowback component to carry out the compression process.

In an embodiment, the lower buffer area is provided with an upper valve and a lower valve. The upper valve is arranged between the air inlet and the second sieve plate, the lower valve is arranged between the second sieve plate and the compression mechanism, and both the upper valve and the lower valve are configured to support the thin metal material.

By adopting the technical solution, the upper valve and the lower valve are arranged in the lower buffer area, so that the falling thin metal material can be conveniently dropped into the compression mechanism step by step.

In an embodiment, the filtering mechanism includes a filtering cavity. A primary filtering component, a secondary filtering component and a dust container are arranged in the filtering cavity, and the dust-containing airflow sequentially passes through the primary filtering component and the secondary filtering component in the filtering cavity. The primary filtering component is configured to filter the dust-containing airflow and convey the dust into the dust container, and the secondary filtering component is configured to perform secondary filtering on the dust-containing airflow passing through the primary filtering component.

By adopting the technical solution, the primary filtering component and the secondary filtering component are arranged, so that the secondary filtering of dust-containing airflow can be realized, which is convenient for workers to control the cleanliness of air discharged outside the equipment by controlling the filtering precision of the used filter materials; and the dust can be collected while the filtering is completed by arranging the dust container.

In an embodiment, the primary filtering component includes a mounting plate, and the mounting plate is provided with several filtering cartridges configured to filter the dust. A second pulse blowback component is arranged between the mounting plate and the secondary filtering component, and the second pulse blowback component is configured to convey the dust accumulated on surfaces of the several filtering cartridges into the dust container.

By adopting the technical solution, by arranging the several filtering cartridges, a large amount of dust-containing airflow can be preliminarily filtered. When a thickness of a dust layer on the surface of the filtering cartridge reaches a level that affects the filtering performance of the filtering cartridge, the second pulse blowback component can be started to convey the dust accumulated on the surface of the filtering cartridge into the dust container through high-pressure pulse airflow.

In an embodiment, the secondary filtering component is a high-efficiency filter.

By adopting the above technical solution, the high-efficiency filter can capture more than 0.3 micrometers (μm) of particulate dust and various suspended substances, which is suitable for the working condition of secondary filtering.

In an embodiment, the compression mechanism includes a compression box, a compression plate, an electric cylinder, and a waste collection box. A top of the compression box is connected to the separation mechanism and configured to collect the thin metal material. A side of the compression box is opened and connected to the waste collection box, and a connection position between the compression box and the waste collection box is provided with an electric valve. The compression plate is fixedly installed on a push rod of the electric cylinder; and the electric cylinder is arranged in the compression box. The electric cylinder is configured to drive the compression plate to move close to the electric valve when the electric valve is closed.

By adopting the technical solution, after the thin metal material is transported from the separation mechanism to the compression box and accumulated into a metal pile, the electric cylinder is started to drive the push rod to drive the compression plate to push the metal pile to move until it abuts against the electric valve to complete the extrusion of the metal pile. Then, the electric valve is opened, so that the extruded metal pile can enter the waste collection box to complete the collection, thereby increasing the collection amount of metal waste, reducing the interval of manual collection, and further saving the cost of human resources.

In summary, the disclosure includes at least one of the following beneficial technical effects.

1. Under the action of the power gas source, the dust and the thin metal materials can be guided to directionally flow inside the separation mechanism along with the gas flow. After the separation mechanism sieves the flowing gas into the dust-containing gas and the thin metal materials, they are processed separately, that is, the dust-containing gas is filtered by the filtering mechanism, and the thin metal materials are compressed by the compression mechanism, so as to avoid dust from being mixed with the thin metal materials and reduce the possibility of contaminating the clean workshop. Under the action of the inert powder adding mechanism, the inert dust is mixed in the dust-containing gas, which can increase the minimum ignition energy of mixed metal dust to reduce the explosion risk and improve the safety of field work, while the degree of automation is high, which can reduce the cost of human resources.
2. The connection pipe is arranged to provide the connecting passage for the separation mechanism and the filtering mechanism, so that the inert powder storage component can mix the inert dust with the dust-containing gas before the dust-containing gas enters the filtering mechanism under the action of the air pump, and the explosion risk is reduced.
3. When the external dust and the thin metal materials enter the separation chamber with the airflow, the airflow upwards passes through the first sieve plate according to the guiding direction and enters the upper ventilation area, thus entering the filtering mechanism. At this time, the thin metal materials are accumulated under the sieve plate under the interaction of the airflow and the first sieve plate. After the thin metal materials are accumulated to a certain amount, the pulse blowback component is started, so that the accumulated thin metal materials are blown into the compression mechanism for the compression process, thereby realizing the separation of the dust-containing gas and the thin metal materials.

4. After the thin metal material is transported from the separation mechanism to the compression box and accumulated into a metal pile, the electric cylinder is started to drive the push rod to drive the compression plate to push the metal pile to move until it abuts against the electric valve, so as to complete the extrusion of the metal pile. Then, the electric valve is opened, so that the extruded metal pile can enter the waste collection box to complete the collection, thereby increasing the collection amount of metal waste, reducing the interval of manual collection, and further saving the cost of human resources.

DESCRIPTION OF REFERENCE SIGNS

Figure 1:
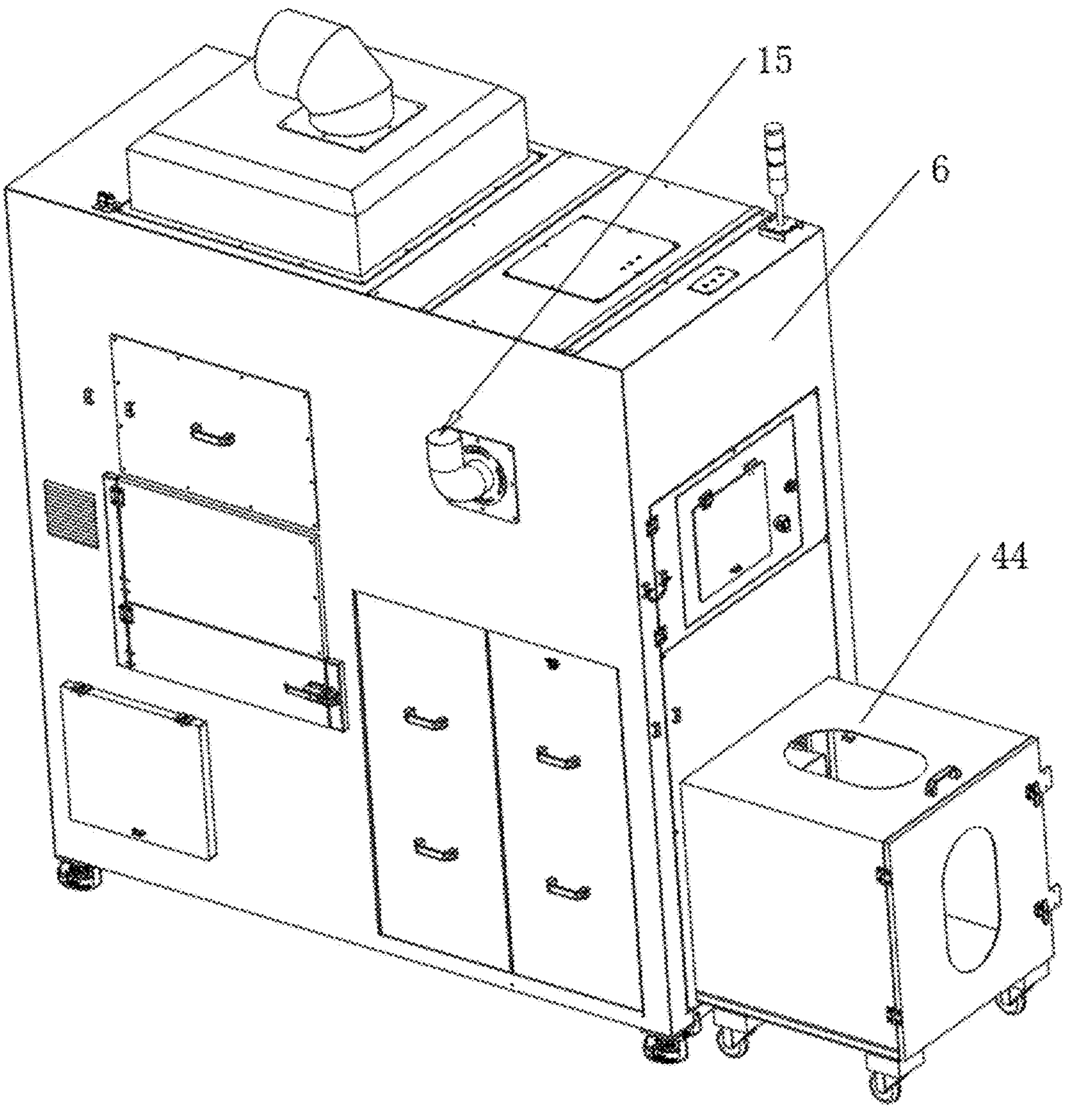
FIG. 1 illustrates an overall schematic structural view of a mixed collection and compression device for dust and thin metal according to an embodiment of the disclosure.

1. separation mechanism; 11. separation chamber; 12. first sieve plate; 13. upper ventilation area; 14. lower buffer area; 15. air inlet; 16. first pulse blowback component; 17. second sieve plate; 2. filtering mechanism; 21. filtering cavity; 22. primary filtering component; 221. mounting plate; 222. filtering cartridge; 223. second pulse blowback component; 23. secondary filtering component; 24. dust container; 3. inert powder adding mechanism; 31. connection pipes; 32. air pump; 4. compression mechanism; 41. compression box; 42. compression plate; 43. electric cylinder; 44. waste collection box; 45. electric valve; 5. power air source; 6. cabinet; 7. upper valve; 8. lower valve.

DETAILED DESCRIPTION OF EMBODIMENTS

Illustrated embodiments of the disclosure are described below with reference to the accompanying drawings, in which various details of the embodiments of the disclosure are included to facilitate understanding, and they should be considered as illustrative only. Therefore, those skilled in the art should realize that various changes and modifications can be made to the embodiments described herein without departing from the scope and spirit of the disclosure. In addition, for the sake of clarity and conciseness, descriptions of well-known functions and structures are omitted in the following description.

It should be noted that the terms "first" and "second" in the disclosure are used to distinguish similar objects, and need not be used to describe a specific order or sequence. It should be understood that the data so used can be interchanged under appropriate circumstances, so that the embodiments of the disclosure described herein can be implemented in other orders than those illustrated or described herein. The embodiments described in the following illustrated embodiments do not represent all embodiments consistent with the disclosure.

Moreover, the term "and/or" in the disclosure is only a description of the relationship between related objects, which means that there can be three kinds of relationships, for example, A and/or B, which can mean that A exists alone, A and B exist simultaneously, and B exists alone. In addition, the character "/" in the disclosure, unless otherwise specified, generally indicates that the context object is an "or" relationship.

A mixed collection and compression device for dust and thin metal material is described below with reference to the accompanying drawings.

Referring to FIG. 1 to FIG. 7, the mixed collection and compression device for the dust and the thin metal material includes a separation mechanism 1, a filtering mechanism 2, an inert powder adding mechanism 3, a compression mechanism 4, and a power gas source 5. The separation mechanism 1 is used to sieve a flowing gas in the separation mechanism 1 into a dust-containing gas and the thin metal material. The filtering mechanism 2 is connected to the separation mechanism 1, the filtering mechanism 2 is used to filter dust in the dust-containing gas. The inert powder adding mechanism 3 is connected between the separation mechanism 1 and the filtering mechanism 2, and the inert powder adding mechanism 3 is used to add inert powder into the dust-containing gas during transportation. The compression mechanism 4 is connected to the separation mechanism 1, the compression mechanism 4 is used to collect and compress the thin metal material. The power gas source 5 is used to provide a negative pressure environment for a gas inside the separation mechanism 1 to make the gas sequentially passes through the separation mechanism 1, the inert powder adding mechanism 3 and the filtering mechanism 2. The mixed collection and compression device further includes a cabinet 6. The separation mechanism 1, the filtering mechanism 2, the inert powder adding mechanism 3, the compressing mechanism 4 and the power gas source 5 are arranged in the cabinet 6 sequentially along a conveying direction of an airflow, and the cabinet 6 provides installation positions and a closed environment for each mechanism. Under an action of the power gas source 5, the dust and the thin metal materials can be guided to directionally flow in the separation mechanism 1 along with the airflow, and the separation mechanism 1 sieves the flowing gas into the dust-containing gas and the thin metal materials, and then processes them separately. That is, the dust-containing gas is filtered by the filtering mechanism 2, and the thin metal material is compressed by the compression mechanism 4, so as to avoid the dust from being mixed with the thin metal material and reduce the possibility of contaminating the clean workshop. Under an action of the inert powder adding mechanism 3, the dust-containing airflow is mixed with inert dust, which can improve the minimum ignition energy of mixed metal dust to reduce the explosion risk and improve the safety of field work, while the degree of automation is high, which can reduce the cost of human resources.

It should be noted that the inert dust refers to dust that is not easy to burn and explode. This kind of dust is usually composed of metal, lime, coal ash, silicate and other substances. The addition of inert dust can reduce the combustibility and explosiveness of dust, which can absorb heat, reduce the system temperature, and dilute the oxygen concentration at the same time, making it difficult to form combustible mixtures between dust particles.

Figure 2:
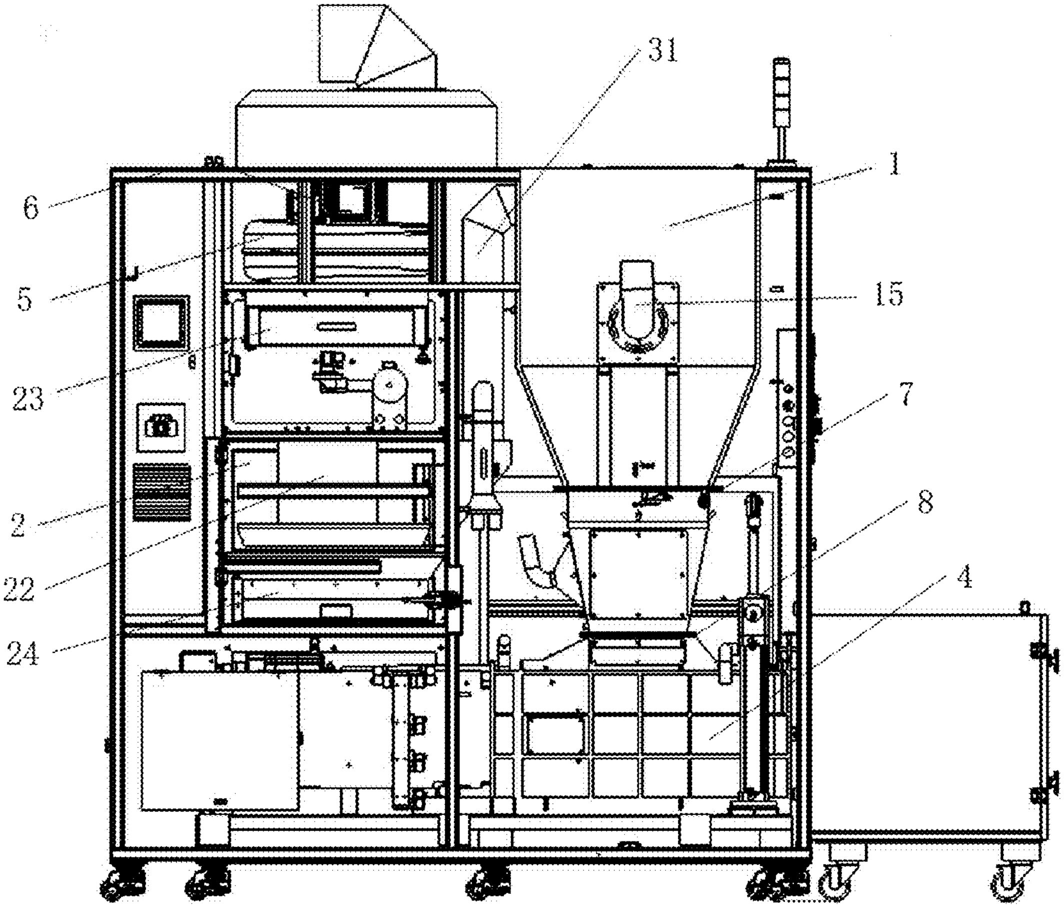
FIG. 2 illustrates a schematic structural view of a separation mechanism, a filtering mechanism, and a compression mechanism in a cabinet according to the embodiment of the disclosure
Figure 5:
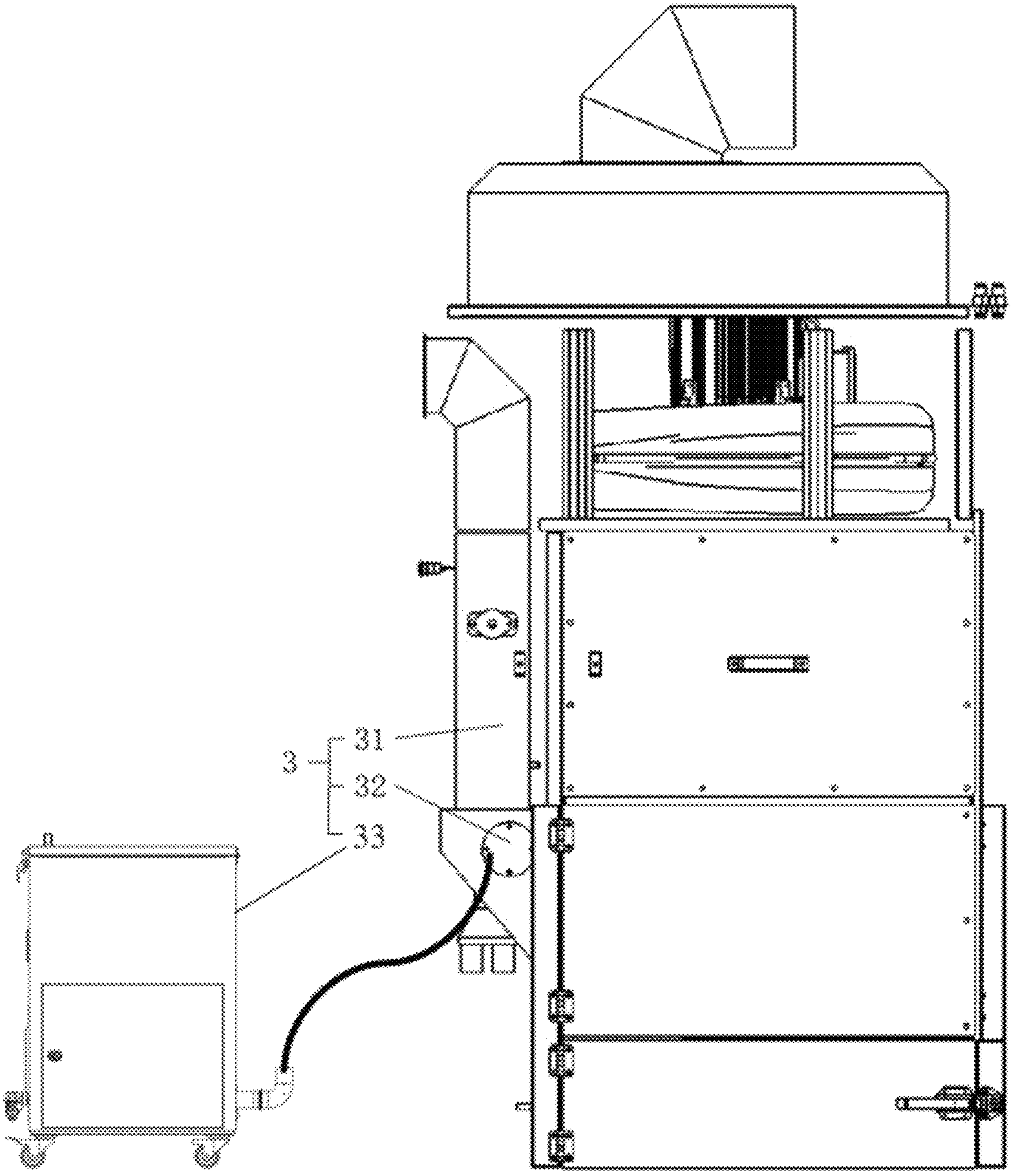
FIG. 5 illustrates a schematic structural view of an inert powder adding mechanism according to the embodiment of the disclosure.

As shown in FIGS. 2 and 5, the inert powder adding mechanism 3 includes a connection pipe 31, an air pump 32 and an inert powder storage component 33. The connection pipe 31 is connected to the separation mechanism 1 and the filtering mechanism 2. The air pump 32 is connected to the connection pipe 31 and the inert powder storage component 33, and the inert powder storage component 33 is equipped with the inert powder. The connection pipe 31 is arranged to provide a connecting passage for the separation mechanism 1 and the filtering mechanism 2, so that the inert powder storage component 33 can mix the inert dust with the dust-containing gas before the dust-containing gas enters the filtering mechanism 2 under the action of the air pump 32, and the explosion risk is reduced. In this case, a wind speed sensor is arranged in the connection pipe 31 to monitor and control the wind speed of the pipe, so that the wind speed in the pipe is required to be above the required wind speed, and dust accumulation is prevented. It should be noted that a pipeline of the inert powder storage component 33 is usually connected to the air pump 32 using conventional a steel wire hose or a metal pipe.

Figure 3:
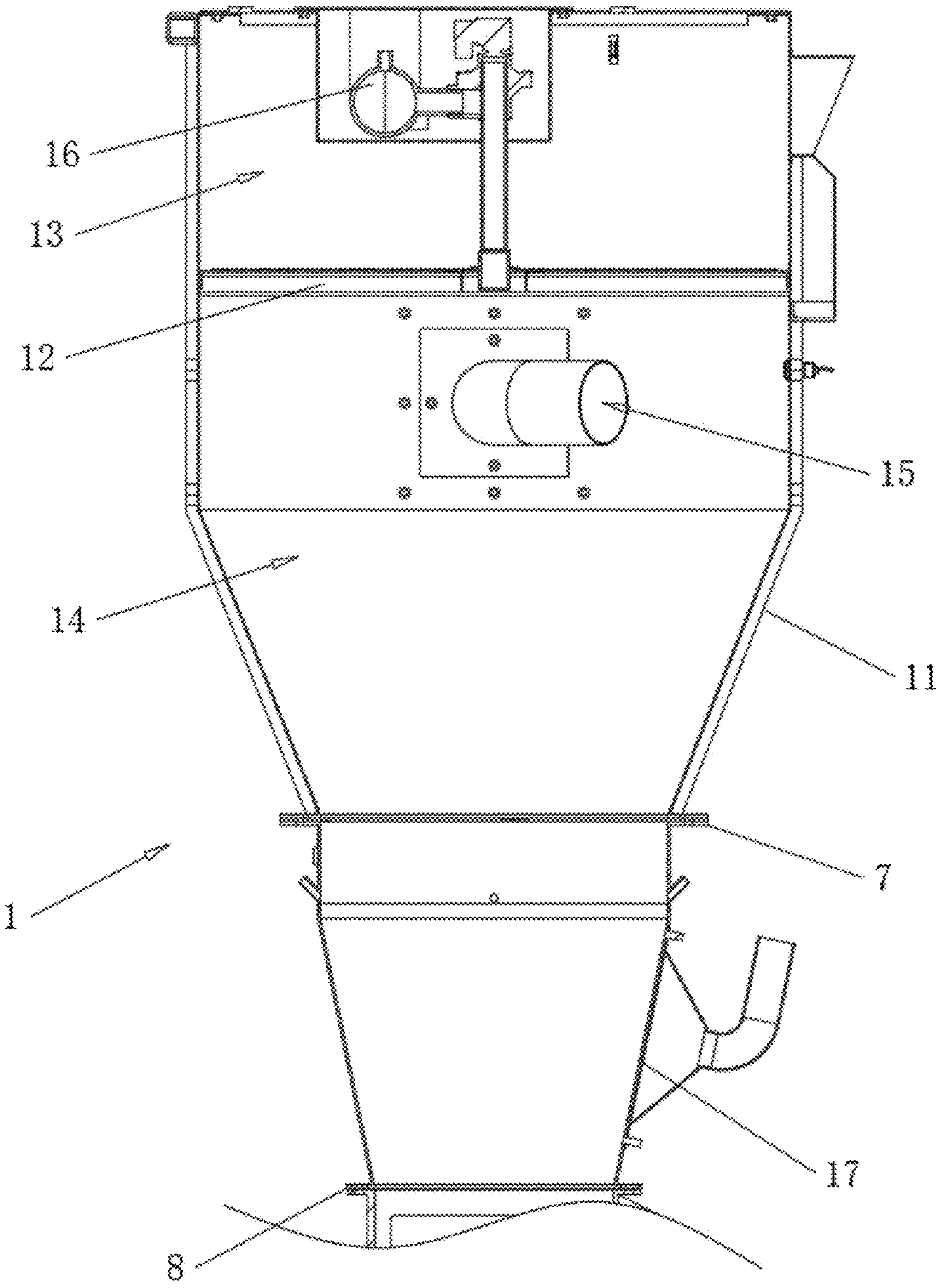
FIG. 3 illustrates a schematic sectional view of the separation mechanism according to the embodiment of the disclosure.

In addition, as shown in FIGS. 2 and 3, the separation mechanism 1 includes a separation chamber 11. A first sieve plate 12 is arranged in the separation chamber 11, and the first sieve plate 12 is used to filter the thin metal materials. The separation chamber 11 is divided into an upper ventilation area 13 and a lower buffer area 14 by the first sieve plate 12, the upper ventilation area 13 is connected to the filtering mechanism 2, and the lower buffer area 14 is connected to the compression mechanism 4. The separation chamber 11 is defined with an air inlet 15, and the air inlet 15 is located in the lower buffer area 14. The first sieve plate 12 is provided with a first pulse blowback component 16, and the first pulse blowback component 16 is used to blow the thin metal materials accumulated under the first sieve plate 12 to the compression mechanism 4. Since the air inlet 15 is arranged in the lower buffer area 14, when the external dust and the thin metal materials enter the separation chamber 11 with the airflow, the airflow upwards passes through the first sieve plate 12 according to a guiding direction and enters the upper ventilation area 13, thus entering the filtering mechanism 2. At this time, the thin metal material is accumulated below the sieve plate under the interaction of the airflow and the first sieve plate 12. After the thin metal material is accumulated to a certain amount, the pulse blowback component is started, so that the accumulated thin metal materials are blown into the compression mechanism 4 to carry out a compression process, thereby realizing the separation of the dust-containing gas and the thin metal materials.

Further, the lower buffer area 14 is connected to the filter mechanism 2, a connection position of the lower buffer area 14 is provided with a second sieve plate 17, and the second sieve plate 17 is used to filter thin metal materials. The lower buffer area 14 is provided with the connection position for connecting to the filtering mechanism 2, so that part of escaped dust affected by gravity can enter the filtering mechanism 2 from the lower buffer area 14 along with the airflow, thereby improving the filtering efficiency. By arranging the second sieve plate 17, the thin metal material can be effectively resisted from passing through, and at the same time, the high-pressure pulse airflow enters the compression mechanism 4 under the action of the pulse blowback component to carry out the compression process.

It should be noted that the first sieve plate 12 and the second sieve plate 17 can be selected from a variety of different sizes of sieves for separation, and the size of dust entering the filtering mechanism 2 can be controlled by controlling the sizes of the sieves.

Further, the lower buffer area 14 is provided with an upper valve 7 and a lower valve 8. The upper valve 7 is arranged between the air inlet 15 and the second sieve plate 17, the lower valve 8 is arranged between the second sieve plate 17 and the compression mechanism 4, and both the upper valve 7 and the lower valve 8 are used to support the thin metal materials. The upper valve 7 and the lower valve 8 are arranged in the lower buffer area 14, so that the falling thin metal materials can be conveniently dropped into the compression mechanism step by step. That is, when the thin metal materials accumulated in the lower buffer area 14 are less, the upper valve 7 is opened and the lower valve 8 is closed, so that the first sieve plate 12 and the second sieve plate 17 can screen the thin metal materials at the same time and make the thin metal materials accumulate at the lower valve 8. After running for a period of time, the upper valve 7 is closed and the lower valve 8 is opened. At this time, the thin metal materials accumulate into a certain weight to become a metal pile, which can naturally fall into the compression mechanism 4, and can avoid the return of the thin metal materials to the upper valve 7.

Figure 4:
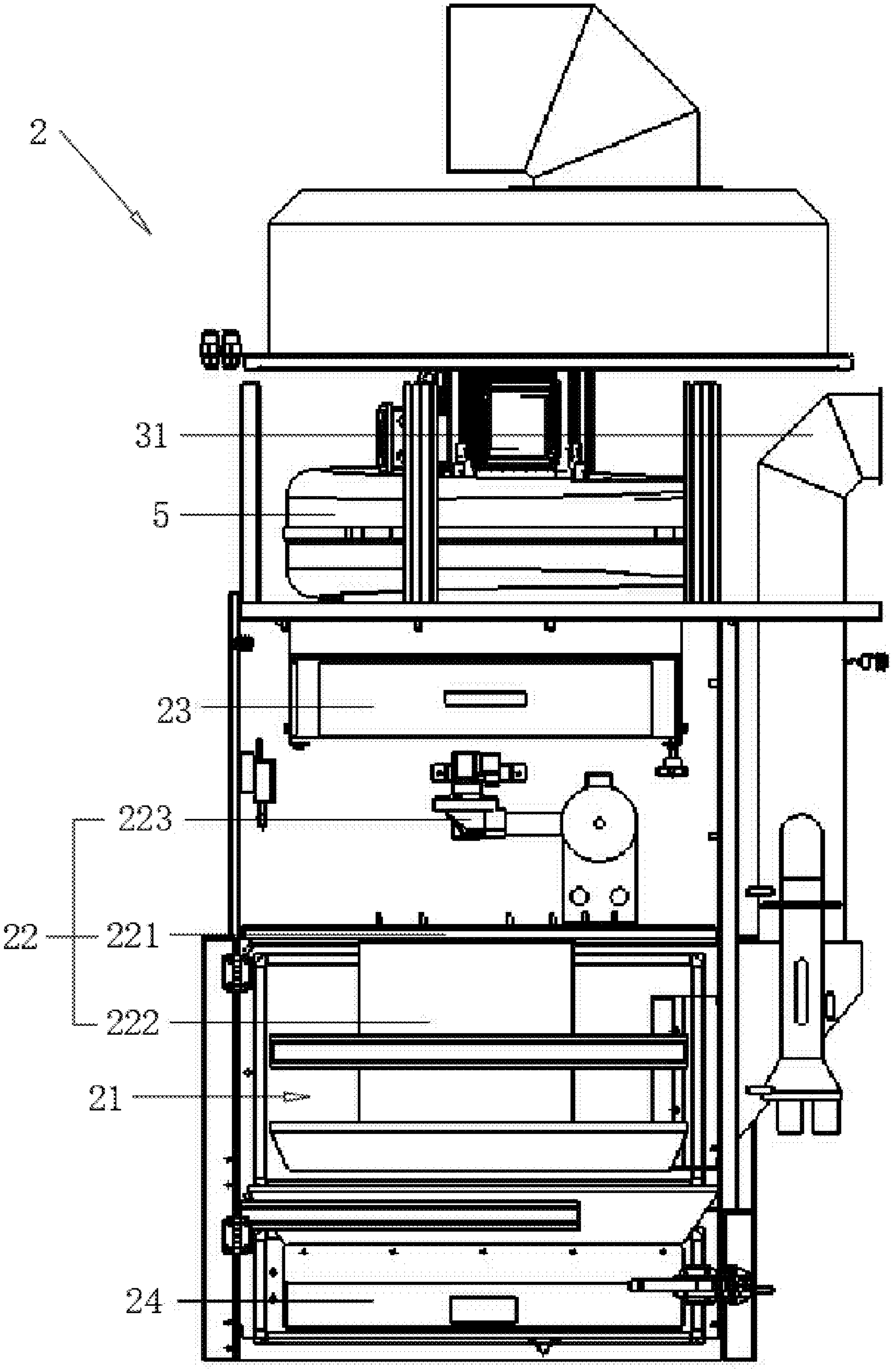
FIG. 4 illustrates a schematic sectional view of the filtering mechanism according to the embodiment of the disclosure.

In addition, as shown in FIG. 2 and FIG. 4, the filtering mechanism 2 includes a filtering cavity 21. A primary filtering component 22, a secondary filtering component 23, and a dust container 24 are arranged in the filtering cavity 21. The dust-containing airflow sequentially passes through the primary filtering component 22 and the secondary filtering component 23. The primary filtering component 22 is used to filter the dust-containing airflow and convey the dust into the dust container 24, and the secondary filtering component 23 is used to perform secondary filtering. By arranging the primary filtering component 22 and the secondary filtering component 23, the secondary filtering of dust-containing airflow can be realized, which is convenient for workers to control the cleanliness of air discharged to the outside of the equipment by controlling the filtering accuracy of the used filter materials, and the dust can be collected while the filtering is completed by arranging the dust container 24.

Specifically, the primary filtering component 22 includes a mounting plate 221, and the mounting plate 221 is provided with several filtering cartridges 222 used to filter the dust. A second pulse blowback component 223 is arranged between the mounting plate 221 and the secondary filtering component 23, and the second pulse blowback component 223 is used to convey the dust accumulated on surfaces of the several filtering cartridges 222 into the dust container 24. By arranging the filtering cartridges 222, a large amount of dust-containing airflow can be preliminarily filtered. When a thickness of a dust layer on the surface of the filtering cartridge 222 reaches a level that affects the filtering performance of the filtering cartridge 222, the second pulse blowback component 223 can be started to convey the dust accumulated on the surface of the filtering cartridge 222 into the dust container through high-pressure pulse airflow.

It should be noted that the above-mentioned first pulse blowback component 16 and second pulse blowback component 223 have the same structural principle, and they are existing equipment, which can be obtained through purchasing, and are mainly composed of a pneumatic system and a control system. Their working principle is to generate impact and shear force by means of high-pressure gas pulse jet to knock down the dust and dirt on the filters or sieves, which is a common knowledge of those skilled in the art and will not be repeated herein.

Specifically, the secondary filtering component 23 is a high-efficiency filter, the filter can capture more than 0.3 μm of particulate dust and various suspended substances, which is suitable for the working condition of secondary filtering.

It should also be noted that the power air source 5 mainly includes a fan power unit and an internal flow field channel of the cabinet 6. The fan power unit can provide air volume and negative pressure for the whole machine and the pipe system connected to the machine, generate power in the system, guide the dust and the thin metal to move in the flow field channel, and bring them into the cabinet 6 from the pipe system. Its structure and principle are well known to those skilled in the art, and will not be described herein.

Figure 6:
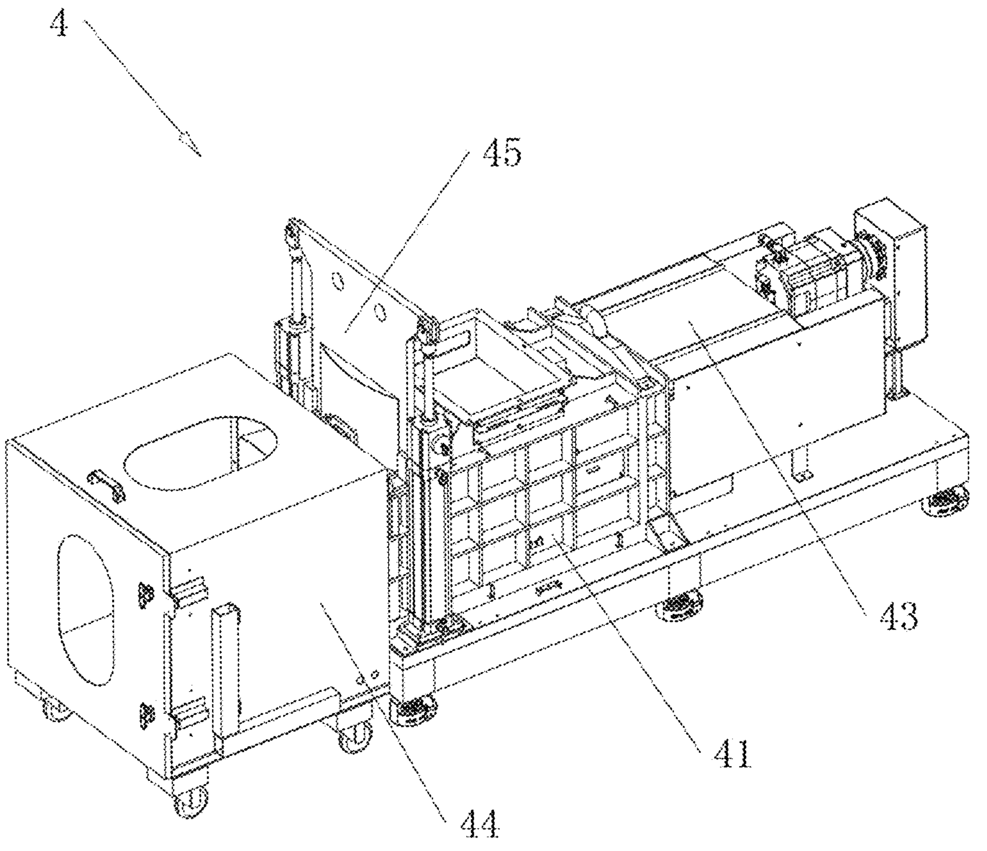
FIG. 6 illustrates an overall schematic structural view of the compression mechanism according to the embodiment of the disclosure.
Figure 7:
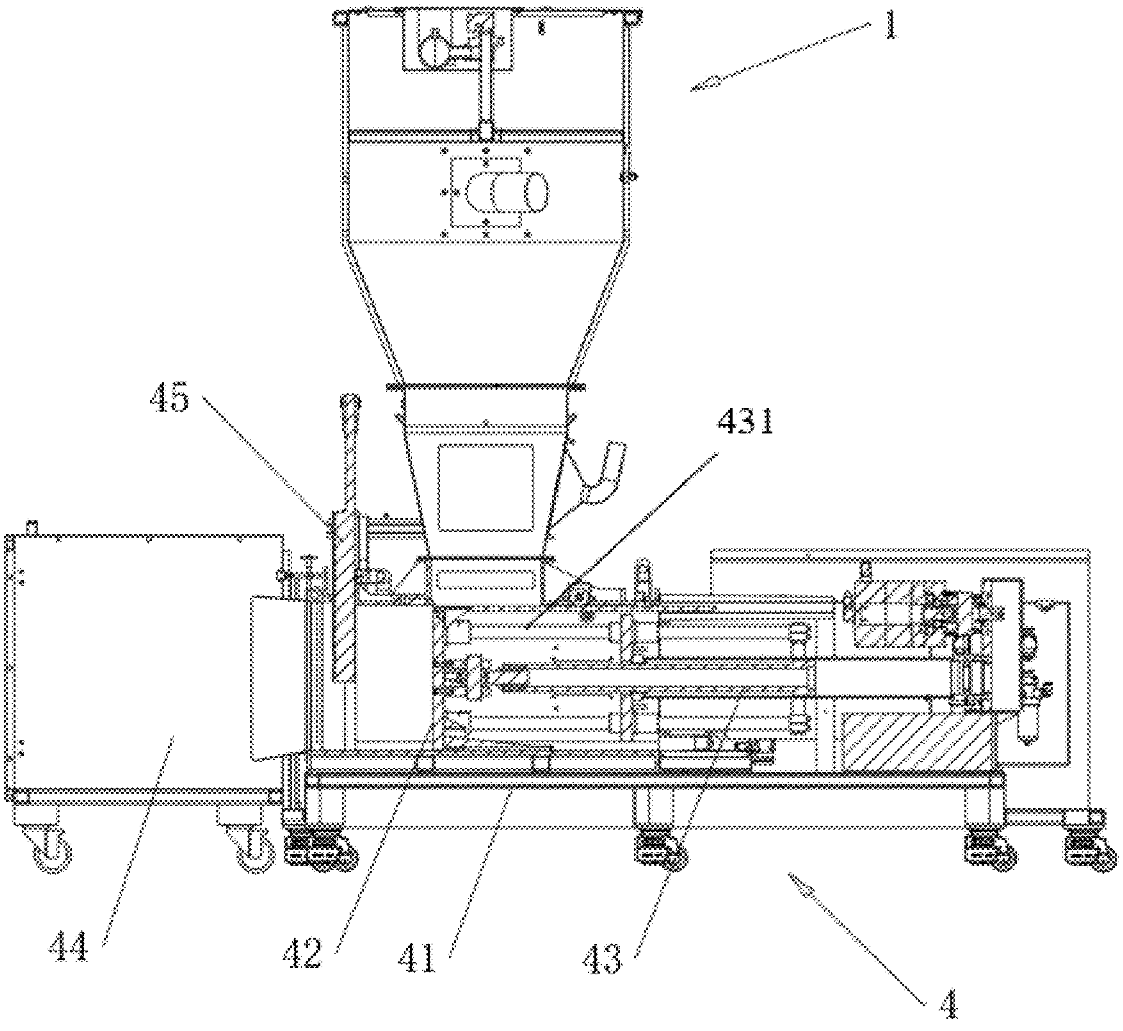
FIG. 7 illustrates a schematic sectional view of the compression mechanism and the separation mechanism assembled according to an embodiment of the disclosure.

In this embodiment, as shown in FIGS. 6 and 7, the compression mechanism 4 includes a compression box 41, a compression plate 42, an electric cylinder 43, and a waste collection box 44. A top of the compression box 41 is connected to the separation mechanism 1 and is used to collect the thin metal materials. A side of the compression box 41 is opened and connected to the waste collection box 44, and a connection position between the compression box 41 and the waste collection box 44 is provided with an electric valve 45. The compression plate 42 is fixedly installed on a push rod 431 of the electric cylinder 43; and the electric cylinder 43 is arranged in the compression box 41. The electric cylinder 43 is used to drive the compression plate 42 to move close to the electric valve 45 when the electric valve 45 is closed. During compression, after the thin metal material is transported from the separation mechanism 1 to the compression box 41 and accumulated into a metal pile, the electric cylinder 43 is started to drive the push rod 431 to drive the compression plate 42 to push the metal pile to move until it abuts against the electric valve 45 to complete the extrusion of the metal pile. Then, the electric valve 45 is opened, so that the extruded metal pile can enter the waste collection box 44 to complete the collection, thereby increasing the collection amount of metal waste, reducing the interval of manual collection, and further saving the cost of human resources.

The above specific embodiments do not limit the protection scope of the disclosure. It should be understood by those skilled in the art that various modifications, combinations, sub-combinations and substitutions can be made according to design requirements and other factors. Any modification, equivalent substitution and improvement made within the spirit and principle of the disclosure should be included in the protection scope of the disclosure.

What is claimed is:

1. A mixed collection and compression device, comprising:

- a separation mechanism (1), configured to sieve a flowing gas in the separation mechanism (1) into a dust-containing gas and a metal material;
- a filtering mechanism (2), connected to the separation mechanism (1), wherein the filtering mechanism (2) is configured to filter dust in the dust-containing gas;
- an inert powder adding mechanism (3), connected between the separation mechanism (1) and the filtering mechanism (2), wherein the inert powder adding mechanism (3) is configured to add inert powder into the dust-containing gas during transportation;
- a compression mechanism (4), connected to the separation mechanism (1), wherein the compression mechanism (4) is configured to collect and compress the metal material; and
- a power gas source (5), configured to provide a negative pressure environment for a gas inside the separation mechanism (1) to make the gas sequentially pass through the separation mechanism (1), the inert powder adding mechanism (3), and the filtering mechanism (2).

2. The mixed collection and compression device as claimed in claim 1, wherein the inert powder adding mechanism (3) comprises a connection pipe (31), an air pump (32), and an inert powder storage component (33); the connection pipe (31) is connected to the separation mechanism (1) and the filtering mechanism (2), the air pump (32) is connected to the connection pipe (31) and the inert powder storage component (33), and the inert powder storage component (33) is equipped with the inert powder.

3. The mixed collection and compression device as claimed in claim 1, wherein the separation mechanism (1) comprises a separation chamber (11); a first sieve plate (12) is arranged in the separation chamber (11), and the first sieve plate (12) is configured to filter the metal material; the separation chamber (11) is divided into an upper ventilation area (13) and a lower buffer area (14) through the first sieve plate (12), the upper ventilation area (13) is connected to the filtering mechanism (2), and the lower buffer area (14) is connected to the compression mechanism (4); the separation chamber (11) is defined with an air inlet (15), and the air inlet (15) is located in the lower buffer area (14); and the first sieve plate (12) is provided with a first pulse blowback component (16), and the first pulse blowback component (16) is configured to blow the metal material accumulated under the first sieve plate (12) to the compression mechanism (4).

4. The mixed collection and compression device as claimed in claim 3, wherein the lower buffer area (14) is connected to the filtering mechanism (2), a connection position of the lower buffer area (14) is provided with a second sieve plate (17), and the second sieve plate (17) is configured to filter the metal material.

5. The mixed collection and compression device as claimed in claim 4, wherein the lower buffer area (14) is provided with an upper valve (7) and a lower valve (8), the upper valve (7) is disposed between the air inlet (15) and the second sieve plate (17), the lower valve (8) is disposed between the second sieve plate (17) and the compression mechanism (4), and the upper valve (7) and the lower valve (8) are configured to support the metal material.

6. The mixed collection and compression device as claimed in claim 1, wherein the filtering mechanism (2) comprises a filtering cavity (21); a primary filtering component (22), a secondary filtering component (23), and a dust container (24) are arranged in the filtering cavity (21); a dust-containing airflow sequentially passes through the primary filtering component (22) and the secondary filtering component (23) in the filtering cavity (21); the primary filtering component (22) is configured to filter the dust-containing airflow and convey the dust into the dust container (24), and the secondary filtering component (23) is configured to perform secondary filtering on the dust-containing airflow passing through the primary filtering component (22).

7. The mixed collection and compression device as claimed in claim 6, wherein the primary filtering component (22) comprises a mounting plate (221); the mounting plate (221) is provided with a plurality of filtering cartridges (222) configured to filter the dust; a second pulse blowback component (223) is provided between the mounting plate (221) and the secondary filtering component (23), and the second pulse blowback component (223) is configured to convey the dust accumulated on surfaces of the plurality of filtering cartridges (222) into the dust container (24).

8. The mixed collection and compression device as claimed in claim 6, wherein the secondary filtering component (23) is a filter.

9. The mixed collection and compression device as claimed in claim 1, wherein the compression mechanism (4) comprises a compression box (41), a compression plate (42), an electric cylinder (43), and a waste collection box (44); a top of the compression box (41) is connected to the separation mechanism (1) and configured to collect the metal material; a side of the compression box (41) is opened and connected to the waste collection box (44), and a connection position between the compression box (41) and the waste collection box (44) is provided with an electric valve (45); the compression plate (42) is fixedly installed on a push rod (431) of the electric cylinder (43), and the electric cylinder (43) is arranged in the compression box (41); and the electric cylinder (43) is configured to drive the compression plate (42) to move close to the electric valve (45) when the electric valve (45) is closed.

* * * * *